H. S. BUTTERFIELD.
AZIMUTH CHRONOMETER.
APPLICATION FILED MAR. 30, 1912.

1,219,372.

Patented Mar. 13, 1917.
5 SHEETS—SHEET 1.

Witnesses:

Inventor:
Horace S. Butterfield

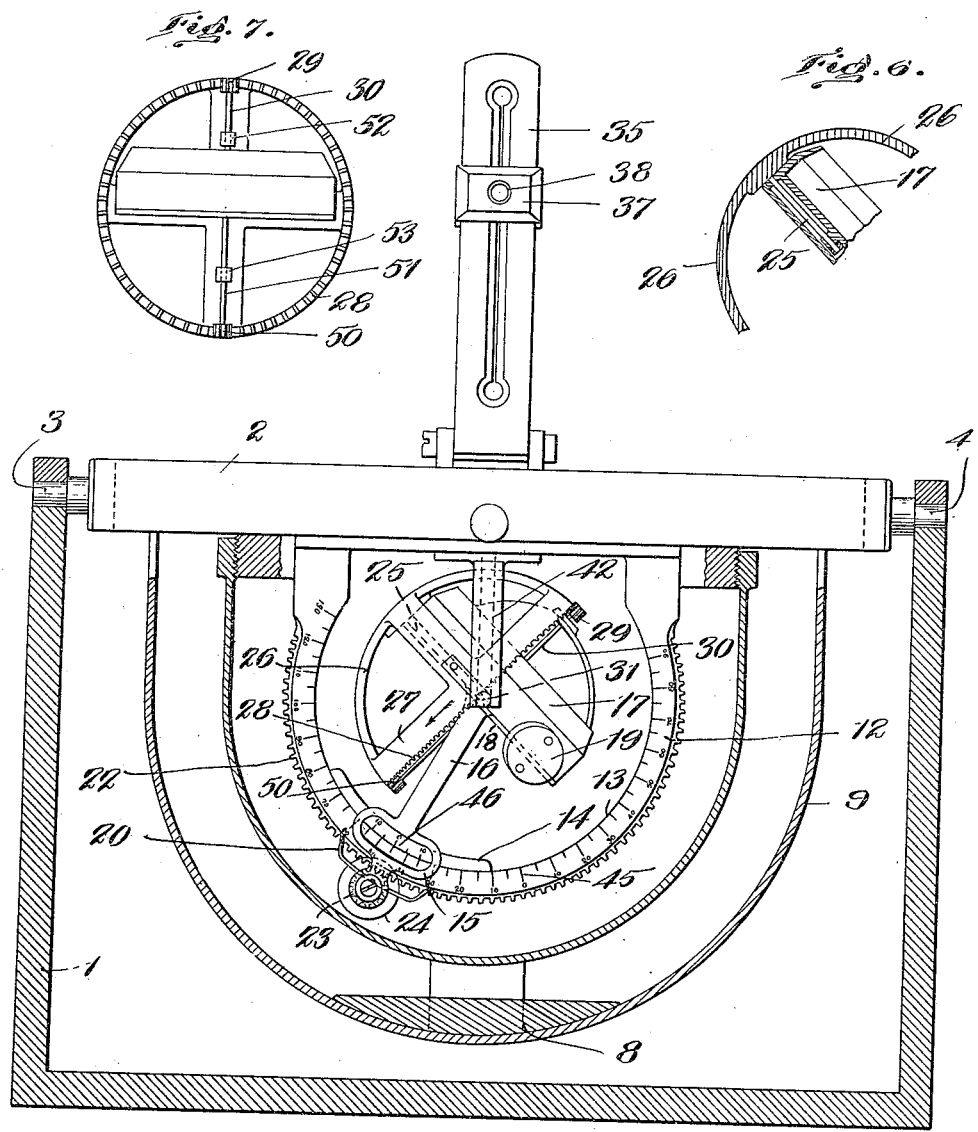

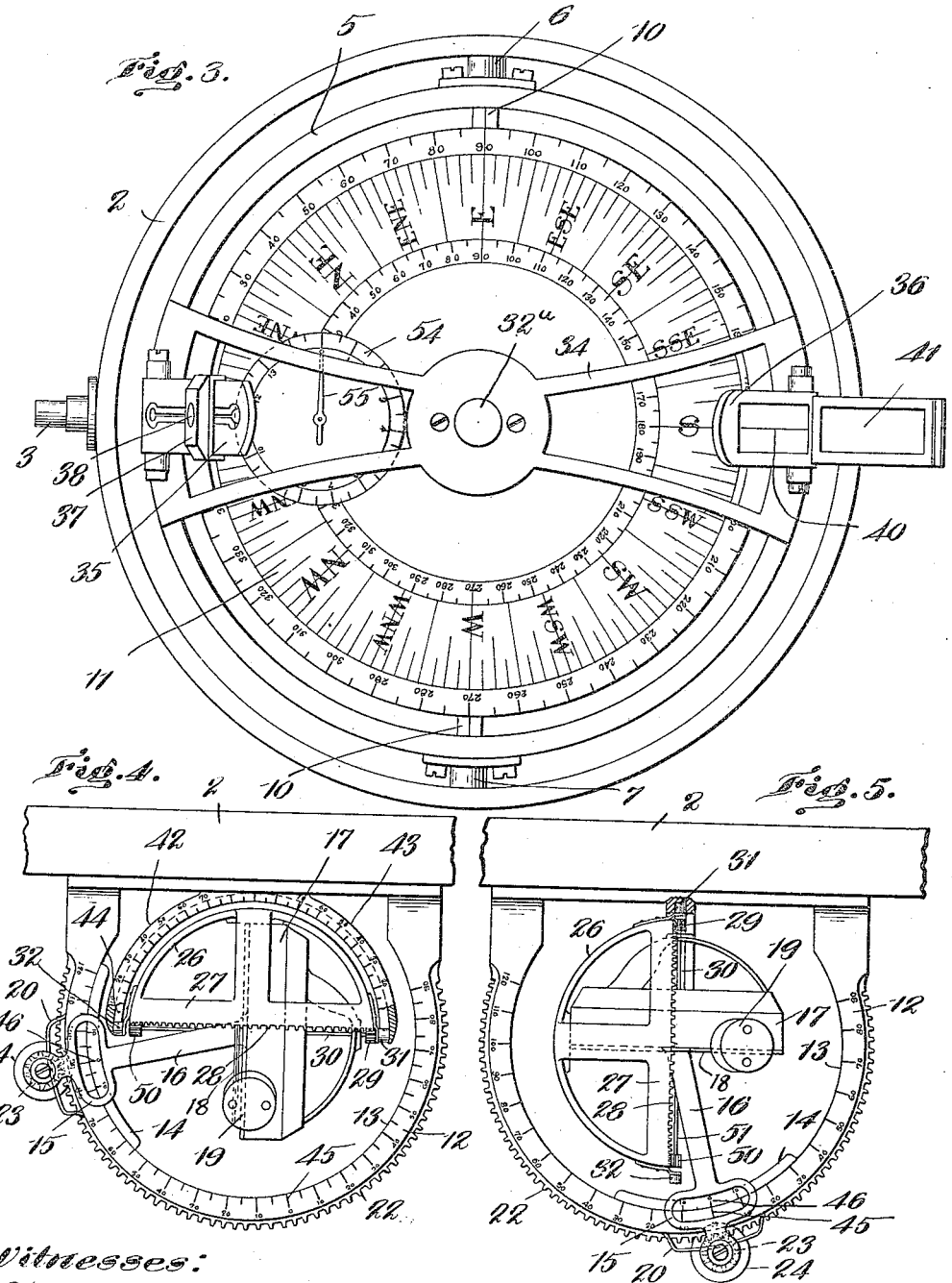

H. S. BUTTERFIELD.
AZIMUTH CHRONOMETER.
APPLICATION FILED MAR. 30, 1912.

1,219,372.

Patented Mar. 13, 1917.
5 SHEETS—SHEET 4.

Witnesses:
Wm. H. Moody
O. W. Pezzetti

Inventor:
Horace S. Butterfield
by Knight Brown Quinby May
attys.

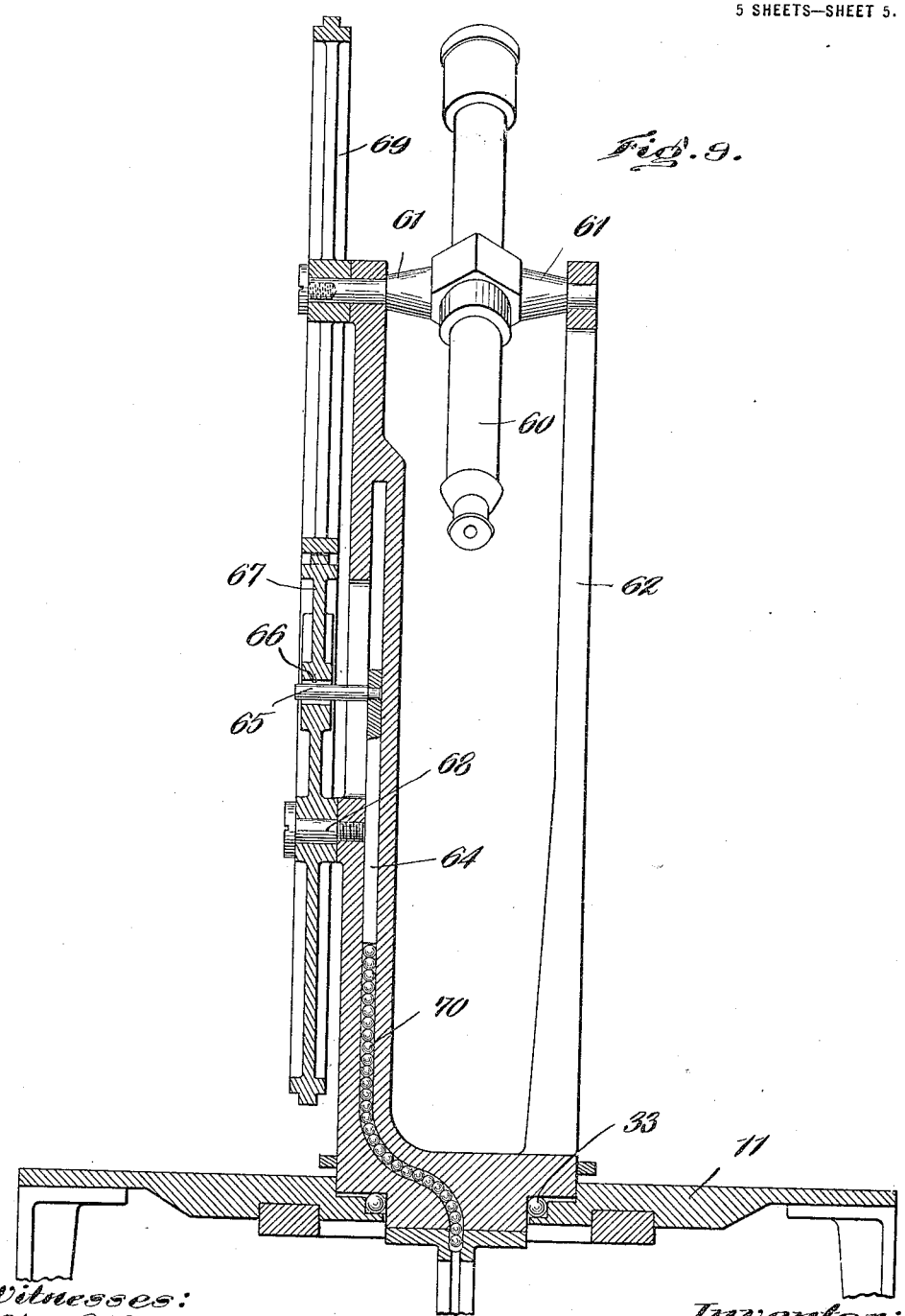

UNITED STATES PATENT OFFICE.

HORACE S. BUTTERFIELD, OF PORTLAND, OREGON.

AZIMUTH-CHRONOMETER.

1,219,372.

Specification of Letters Patent.  Patented Mar. 13, 1917.

Application filed March 30, 1912. Serial No. 687,325.

*To all whom it may concern:*

Be it known that I, HORACE S. BUTTERFIELD, a citizen of the United States, and resident of Portland, in the county of Multnomah and State of Oregon, have invented certain new and useful Improvements in Azimuth-Chronometers, of which the following is a specification.

The object of the present invention is to provide an instrument of precision, adapted, among other things, to designate the true bearing of the sun or any other celestial body continuously through successive points of time, and including an automatic driving motor and mechanical connections by which a sighting means may be moved in a manner conforming to the alteration in the true bearing, or azimuth, of the celestial body. Another object which is related to the foregoing object is to provide a novel and improved mechanism by which a telescope may be so moved as to maintain its line of sight upon a celestial body throughout the apparent movement of the body with relation to the earth. It is my purpose to provide means by which the sighting member may be moved in a horizontal plane at the same rate as the change in the bearing of the sun or other distant object with which the sighting member is alined, to the end that compass errors and true directions may be accurately determined continuously during successive points of time.

Reducing the invention to a practical embodiment of means, I have devised a mechanism by which a driving member traveling at a uniform rate of speed is enabled to produce variable movement in a driven member, and provisions for so adjusting the driving member that the variation in the movement of the driven member may also be varied from nothing (in which case the driven member has uniform motion) to the opposite limit where no motion whatever is given to the driven member, which I believe to be broadly novel, and for which I desire protection. The instrument which I have produced in reducing my invention to practical form, and which is one of the possible constructions in which the essential principles of the invention may be embodied is illustrated in the accompanying drawings and described in the following specification.

In the drawings,

Fig. 2 is a vertical section at right angles to that of Fig. 1.

Fig. 3 is a plan view of the instrument.

Figs. 4 and 5 are detail elevations of the driving mechanisms, showing them in different adjustments.

Fig. 6 is a sectional view illustrating a detail of the construction.

Fig. 7 is a detail elevation of a portion of the mechanism.

Figs. 8 and 9 are, respectively, a sectional view and elevation illustrating the application of the principles of the invention to an astronomical telescope and the additional means for controlling the elevation of the telescope.

Figure 1:
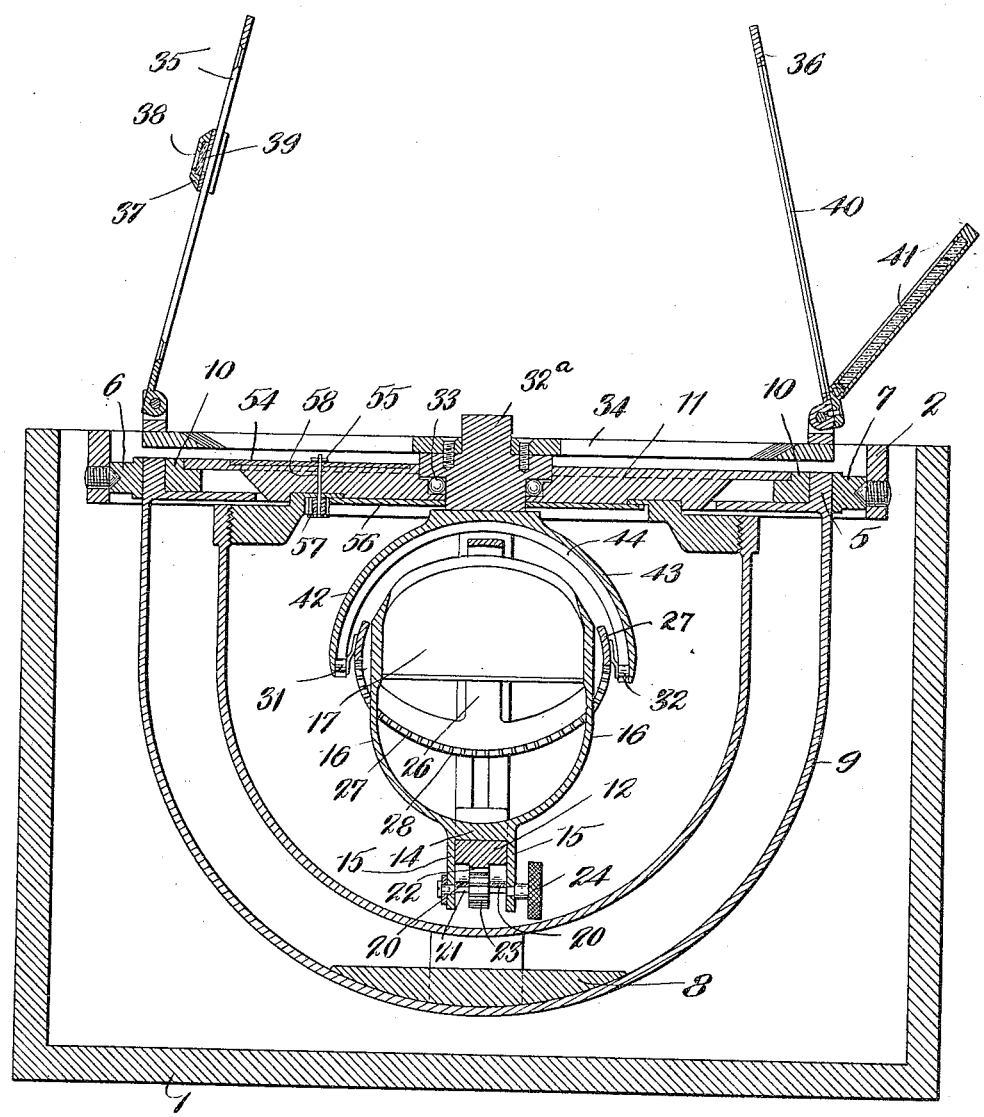
Figure 1 represents a vertical transverse section of the instrument.

I will first describe the construction of the instrument and the principles involved therein, and will then explain some of the purposes and uses for which it is designed and to which it may be applied.

The particular instrument here shown includes a case or box 1 in which a ring 2 is hung by means of diametrically opposite pivots or trunnions 3, 4. Within the ring 2 is a second ring 5 hung by diametrically opposite pivots 6, 7 on an axis at right angles to the axis of the first named pivots. A weight 8 is suspended from the ring 5 by a suspension means 9 by which the ring is enabled to remain horizontal by turning about the gimbal pivots, however the box or case may be inclined.

The inner ring carries bearing blocks or chairs 10 on which is supported a pelorus or dial 11, the latter being sufficiently free to enable it to be rotated in a horizontal plane. Secured to the under side of the pelorus and depending therefrom in a diametral plane is a rigid and sufficiently strong and massive bar or bow 12 which is circularly curved, through an arc of preferably more than one hundred and eighty degrees. This bow serves to support and provide for adjustment of the driving mechanism of the instrument.

Resting upon an inner face 13 of the bow is a complementally curved plate 14 having ears 15 which embrace the bow, as best shown in Fig. 1, and divergent arms 16 to and between which is secured a motor 17. This motor may be of any desired character provided only it is capable of running at a substantially uniform rate of speed. Preferably it is a spring driven watch or clock having all the usual parts of such a time piece, including a dial and hands. Conveniently the dial and hands are on the side of the clock to which the numeral 18 is applied, although the position of these parts is immaterial, provided they are so placed that they can be seen. A head 19 is provided for winding and setting the clock by means of any of the mechanisms commonly used for this purpose. The clock is not illustrated more in detail because the one used in the present instrument is a standard eight-day clock of well known character, and in itself is not a part of the invention. It is merely one type of driving motor, and in one of the aspects of the invention is to be considered as simply an embodiment of means for producing motion at a uniform rate of speed. The plate 14 and lugs 15 fit accurately upon three sides of the curved bar 12. Bearing on the fourth or outer side are springs 20 which are confined between such fourth side and a pinion shaft 21 which is journaled in the lugs 15 and extends across the space between the latter. There are two springs 20 which are separated and flank a circular line of teeth 22 on the outer face of the bar 12, and a pinion 23 is mounted upon the shaft 21 between the springs and meshes with such teeth. Rotation of the pinion 23 by means of a head 24 on the shaft 21 causes the parts which are engaged with the bar 12 to be moved in one direction or the other along the latter, and causes the clock or motor, which is located approximately at the center of curvature in the bar 12 to be moved angularly about such center.

Pivoted at one side of the clock or motor 17 by means of a shaft 25 which has a sufficiently firm bearing in the frame of the motor, is a frame 26 which carries a circular ring 27 toothed on one edge at 28 and surrounding the motor 17. The toothed edge of the ring 27 forms a circular curve which is in a plane passing close to the center of curvature of the bar 12 and of which the center of curvature lies in the line of the pivotal axis 25, which is also the geometrical axis of the ring 27. A pinion 29 is mounted on a staff 30 which forms a continuation of one of the shafts or staffs of the motor 17, and meshes with the teeth 28 of the ring 27. When, as in the present case, the motor is a clock movement, the staff 30 is a continuation of, or is driven by, the center staff of the movement, which makes a complete rotation every hour. The gear ratio between the pinion 29 and ring 27 is such that the latter rotates once in every twenty-four hours. In any event, whatever may be the type of motor used, the speed is so regulated as to cause the ring 27, or its equivalent, to have this rate of rotation, and to maintain the rate uniform at all times. Mounted upon the ring 27 at diametrically opposite points thereof are studs 31 and 32, of which the manner of mounting is sufficiently shown in the drawings. These studs are so located that they travel in a circular path which is perpendicular to the plane of the bar 12, and of which the center of curvature of the bar 12 is the center. As a consequence the adjustments heretofore referred to as being made by the pinion 23 cause the inclination of this path of movement to be changed without altering the perpendicular relation of the path to the plane of the bar 12. The studs perform a function in producing a variable motion which I will now describe in connection with a sighting member or device.

In the center of the pelorus or dial 11 is a stud $32^a$ which rotates within the dial on a vertical axis and is supported upon a frictionless ball bearing 33, as shown in Fig. 1. Secured to this stud is an arm or frame 34 which carries vanes 35 and 36 pivoted upon horizontal pivots at diametrically opposite sides of the stud $32^a$. One of the vanes, as 35, carries a slide 37 having an aperture 38, across which extends a screen 39 for diminishing the intensity of the sun's rays. The other vane is open and carries a fine wire 40 which is arranged in a vertical plane. Pivoted to the outer side of the vane 36 is a mirror 41. The mirror and sighting vanes co-act with one another for finding the bearing of the sun, or a star, or any other distant object. I do not restrict my invention to sighting members of this particular character, or indeed even to any sighting means whatever, properly so called, for any sighting means is one form of indicator by which angles or directions with respect to a specific point on the dial may be shown, and any indicator of whatever character comes within the scope of my invention when employed in connection with the dial in essentially the manner hereinafter described.

Secured to the stud $32^a$ beneath the dial is a member which I term a "yoke" or "guide." It comprises arms 42, 43 which embrace the ring 27 and of which each is a continuation of the other. These arms are circularly curved and contain a correspondingly curved uninterrupted guideway 44 which is in an axial plane of the stud 32 and of which the center of curvature is the points at which the axis of curvature of the bar 12 intersects the axis about which the ring 27 and studs 31 and 32 rotate. The width of the guideway 44 is such that the studs 31 and 32 have a close sliding fit therein.

From the foregoing description the mechanical operation of the instrument may be understood. Assuming first that the adjustment is as shown in Fig. 2, then the path in which the studs 31 and 32 travel is inclined both to the axis of the yoke or guide and to the path in which any point of the yoke or guide rotates. Consequently, assuming the rotation of the ring 27 to be in the direction of the arrow applied thereon in Fig. 2, the stud 31 in traveling up the incline enters the guide way in the end of the yoke arm 42, and imparts motion thereto. The first part of this motion is relatively slow on account of the obliquity of the movement of the stud to the yoke arm, but as the yoke arm, in swinging, becomes more nearly perpendicular to this path of motion, and as the stud travels up in the guide way nearer to the axis of the latter, the speed of the yoke accelerates until it passes the point at which its plane coincides with a plane including the stud and the axis about which the stud rotates, when the speed of that point of the yoke which is engaged by the stud is equal to the speed of the stud. Thereafter, the speed of the yoke begins to diminish. Continuing until the yoke has turned through a half revolution, (the position shown in Fig. 2) the stud 31 passes out of the guideway at the end of arm 42, but just before the stud 31 issues from the guideway, the stud 32 enters the arm 43, because these arms extend through at least one hundred and eighty degrees of arc, as shown in Fig. 1. Thereupon the rotation of the yoke is continued and completed with the same accelerated and retarded motion by the stud 32 acting on the arm 43. An exactly similar motion of horizontal rotation is imparted to the sight vanes, and corresponds to the change in the bearing of the sun at the equinox in the latitude for which the instrument is set, because the studs travel in an orbit parallel to the apparent orbit of the sun with respect to the earth.

Other variable rates of movement between uniform motion and no motion at all are imparted to the yoke and sighting member according to the inclination of the path of movement of the studs. One extreme adjustment is illustrated in Fig. 4, where the slide is carried so far along the bow 12 that the path in which the studs move is horizontal, that is, parallel to the dial and perpendicular to the axis of the yoke. Thus the yoke is rotated at a uniform rate of speed, which is the same as the rate of speed of the studs. The other extreme adjustment is shown in Fig. 5 where the path of the studs is vertical, being perpendicular to the dial 11 and in a plane which includes the axis of the yoke. The yoke then assumes a position coinciding with the path of the studs and is given no rotation whatever.

The bar 12 is graduated in angular degrees, running in both directions from a zero indication at 45. The plate or slide 14 carries an index mark 46 and graduations on each side thereof so placed as to form a vernier. The graduations are so positioned on the curved bar that, with the adjustment shown in Fig. 4, the index 46 is on the ninety degree mark, which corresponds to the latitude of the North Pole. Then the uniform movement given to the sighting members corresponds to the uniform change of the bearing of the sun at the pole. With the adjustment in Fig. 5 the index is on zero, corresponding to the latitude of the equator, and the absence of movement corresponds to the condition in this latitude at the equinoxes, when the sun passes directly overhead without changing its bearing except at noon, when it shifts from east to west. In this position of the instrument, as previously described no motion is given to the sighting members. In other settings of the mechanism the movement of the studs 31 and 32 corresponds to the apparent movement of the sun in latitudes corresponding to the degrees of the scale at the time of the equinoxes. Consequently the variable motion imparted by the studs to the sighting members corresponds to the travel of the sun's projection on a horizontal plane, and thus corresponds to the momentary changes in the sun's bearing.

One of the uses of the instrument is to determine the true bearing, or azimuth, of the sun, in order to show compass errors. In explaining this use, I will assume first that it is made at the time of either equinox because at these times the sun follows the equatorial plane of the earth, and the use of the instrument is most simplified. Then the index 46 is set on the latitude of the place where the observer is located, and the hands of the clock set at local time. This setting of the hands causes the mechanism to be operated in the manner already described so that the sighting members occupy positions corresponding to the time of day. Then the instrument is placed in the sun and the pelorus is shifted until the sighting members are in line with the sun. The compass points on the pelorus then indicate the true directions. The instrument can be thus used at any time of day and without reference to azimuth tables, because the motor automatically takes care of the change of bearing at different points of time.

At other times than the equinoxes the sun's declination is a factor to be considered and is taken care of in the setting of the index 46, by adding or subtracting the declination to or from the latitude, according to the season. For illustration of the last statement let it be assumed that the place at which the instrument is used is latitude forty-five degrees north and the sun is at the summer solstice. The declination of the sun is then twenty-three and one-half degrees north (approximately). To determine the setting of the index, twenty-three and one-half is subtracted from forty-five and the index 46 is then set on the graduation indicating twenty-one and one-half degrees at the left of the zero mark 45. At the winter solstice, when the declination of the sun is about twenty-three and one-half degrees south, the amount of the declination is added to the latitude in order to determine the setting of the instrument, and the index 46 is consequently placed beside the mark indicating sixty-eight and one-half degrees. At other times of the year the instrument is otherwise set according to the sun's declination for the particular day on which the instrument is used, which may be readily found from astronomical tables. When the sighting members are then alined with the sun the bearing is given with approximate correctness at all times within a few hours before and after noon, because, during the middle part of the day the apparent motion of the sun at the place of observation corresponds very closely to such apparent motion at the times of the equinoxes in latitudes twenty-one and one-half degrees north, sixty-eight and one-half degrees north or other latitudes which correspond to the degrees of latitude of the place of observation increased or diminished by the declination of the sun on the day of observation.

A difference in the mode of use of the instrument is made according as the observer is in the Northern or Southern Hemisphere. When in the Northern Hemisphere the setting for latitude is made at the left of the zero indication and when in the Southern Hemisphere it is at the right of zero (with respect to the position of the instrument as seen in Fig. 2.) Thus in the Northern Hemisphere the rotation of the sighting members is clock-wise and in the Southern Hemisphere is anti-clockwise, and corresponds with the course of the sun. The statement above made is true as to observations made outside of the tropics at all seasons of the year, but in the tropics the action is modified by the setting for the sun's declination, the direction of rotation being clockwise or anti-clockwise according as the sun is respectively south or north of the place of observation.

In a similar way the azimuths of stars may be taken, the declination of the star and the local mean time of the star being known, and the foregoing explanation made with reference to the sun applies exactly to observations taken upon any fixed star.

Owing to the necessity of providing a support for the transmission mechanism outside of the pivotal axis about which the mechanism is adjusted, in order that the studs 31 and 32 may rotate without interference with the support, the extent to which the adjustment may be made to the right relatively to Figs. 2, 4, and 5 is limited. That is, the adjustment can not be made beyond the point at which the yoke arms 42, 43 interfere with the supporting arms 16. Consequently although the instrument as here shown is adapted for use in all navigable latitudes, it can not be set for the extreme latitudes in the Southern Hemisphere. In order to permit adjustment as far as latitude ninety degrees south, I provide an alternative means for producing reverse rotation of the annular gear 28, which accomplishes the same effect as swinging the adjustment from the left to the right of the zero indication of the scale. This means consists of a pinion 50 mounted on a staff or shaft 51 which is in alinement with the staff 30 and engages the annular gear 28 at a point diametrically opposite to that of the pinion 29. Each of the staffs 30 and 51 is disconnectibly engaged with the center staff or shaft of the time piece, whereby either one may be connected and the other released. Convenient means for this purpose consists of clutches or binders 52, 53.

From the preceding description of the construction and mode of use of the instrument, it will be readily seen that the setting of the slide 14 as previously described with its index beside the graduation on the curved bar 12 which corresponds to the latitude of the place of observation, so inclines the annular gear 28 that the studs 31 and 32 carried by said gear travel in a plane parallel to the earth's equatorial plane, which is also the plane in which the apparent motion of the sun occurs at the equinoxes. Similarly the setting of the adjustable annular gear to take into account the declination of the sun or other celestial body of which the azimuth is to be taken, in the manner described causes the path of the studs to be displaced from such plane at an angle which is equal to the angle of declination of the sun or other celestial body when near the meridian, and therefore causes the studs to follow the apparent movement of the sun or other celestial body when such body is crossing the meridian and is within thirty or forty-five degrees of the meridian at either side. When the instrument is used in latitudes south of the equator and the direction of rotation of the annular gear is reversed by putting the pinion 50 instead of the pinion 39 into driving connection with the motor, and the settings of the index 46 are made as though for use in northern latitudes, then the studs 31 and 32 are caused to travel in a path perpendicular either to the earth's equatorial plane or to the plane of apparent movement of the celestial body, but as the direction of rotation of these studs is reversed, the same effect is secured through the transmission mechanism as though the settings were at the right of the index mark 45 (with respect to the positions of the instrument indicated in the drawings).

If the principles of the transmission mechanism are analyzed, it will be seen that they comprise essentially a driving member, (either the stud 31 or the stud 32), a driven element (the yoke 42, 43), and a guide element (the groove 44), which is a part of the driven member and is engaged by the driver. It will be further seen that the axes of rotation of these members or elements cross each other and are inclined more or less to one another in all except the two extreme adjustments. In one of these extreme adjustments such axes coincide, and in the other they are at right angles to each other. The adjustment of the driving member to secure variations in the character of variable movement of the driven member occur about the point of intersection of the two axes in such a direction that the axis of rotation of the driving member is shifted in the plane of the axes angularly about the point of intersection to widen or contract the angles between the axes.

It is essential, in order that the engagement between the driving and driven members should be maintained in all adjustments and at all points in the path of the driving member, that the guiding element, or that portion of the driven member which is engaged by the driver, should be curved in spherical relation to this point of intersection, or in other words, that it should lie in the surface of an imaginary sphere of which the center is the said point of intersection. As here shown the guiding element is in a great circle of such imaginary sphere and includes the axis of the driven member, although this particular condition may not be essential in every embodiment and aspect of the invention. The essential condition is that the guiding element should be continuous and equi-distant at all points from the center described.

The face of the dial 11 is inscribed with marks by which bearings may be indicated. Preferably its periphery is graduated in angular degrees, and in addition the dial may be inscribed with the points of the compass. I have provided in addition to the mechanism already described a means by which fractional parts of the divisions of the graduations may be read. This means comprises a subsidiary dial 54 on the dial 11 and preferably graduated in degrees and fractions thereof, and a hand or pointer 55 which is driven synchronously with the motion of the sighting member. The driving means comprises a gear 56 secured upon the part 32$^a$ and a pinion 57 in mesh with the gear and secured to the staff 58 which carries the hand 55. The gear ratio is such that the movement of the hand 55 is considerably more rapid than the movement of the frame 34.

Figure 8:
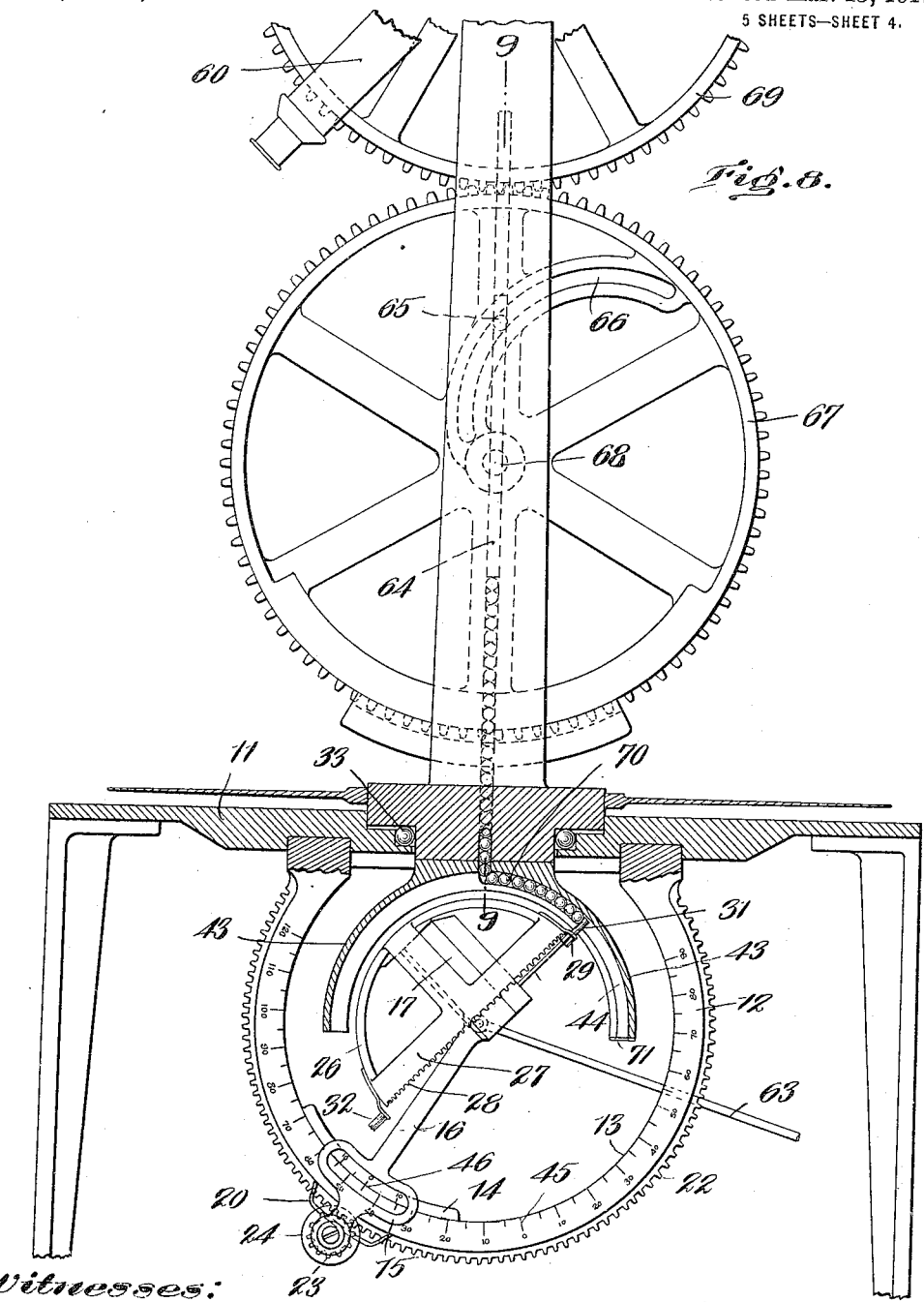

The same or equivalent mechanism may be applied to an instrument designed to follow the path of a celestial body when coupled with means for adjusting elevation of the sighting instrument. A modification of the invention adapted for this purpose is shown in Figs. 8 and 9 where 60 represents an astronomical telescope having horizontal alined pivots 61 journaled in a frame 62 mounted to turn about a vertical axis on a bearing 33. The transmission mechanism is substantially identical with that already described and the parts thereof are identified by similar reference characters. There is a modification in the character of the driving motor, in that the motor is detached from the instrument itself and movement is transmitted from the motor by a shaft 63 which is flexibly connected in any suitable or known manner with the shaft 30 and pinion 29. This mechanism produces a horizontal rotation of the telescope, that is, rotation about a vertical axis, in exactly the manner described. The angle of elevation of the telescope is controlled by a traveler 64 which is arranged to slide in a guide way in one of the arms of the upright frame 62 and has a pin or stud 65 entering a cam groove 66 in a wheel 67 pivoted at 68 to the upright frame. This wheel is toothed and meshes with a complemental toothed wheel 69 on one of the pivots 61 of the telescope. A flexible pusher extends from the driver 64 into the guideway of one of the yoke arms 43 and is adapted to be engaged by either of the driving studs 31 or 32 entering the guideway. This pusher is preferably a line of balls 70 and is thereby adapted to follow a sinuous course without elongation or contraction. Assuming that the telescope is so poised or weighted as to tend to swing into the horizontal position, its weight maintains a downward pressure upon the driver 64 and pusher 70, requiring only compressive force to be exerted on the latter and taking up all backlash. The cam 66 is so designed that equal movements of the driver produces equal amounts of angular rotation of the wheels 67 and 69. Hence movements of the stud 31 in the path of the celestial body under observation produce corresponding movements of the telescope and keep the latter trained continuously upon the body. A stop 71 is mounted at the lower end of the guide way 44 and is of suitable form and dimensions to allow the stud 31 to pass it and to prevent the balls from falling out of the guide way.

The instrument made as above described or made in any other or modified manner, or in any manner, provided it includes the essential principles of my invention hereinbefore explained, is capable of wide and varied uses in navigation, surveying, astronomical work, etc. It will be understood that factors in the use of the instrument are, latitude, local mean time, declination of the sun or stars, azimuths and the true meridian. With one or more of these factors known, the others may be determined by proper use of the instrument. Not only can it be used to determine the true bearing of the sun or a star and thus establish the meridian and determine compass errors, but it may also be used as a means for determining latitude and longitude. It may also be employed as a compass in parts of the earth where magnetic variations render the magnetic compass unreliable. This instrument in combination with a means for showing the time at a certain known point on the earth's surface can be used for all the purposes of navigation without the aid of any other instrument or tables. In addition, I desire to apply the invention to a means for setting time pieces by the sun, to serve the purpose of a sun dial or sun-time indicator in open places, and to serve as a means by which local mean time or local sidereal time may be accurately and immediately determined.

I am aware that the essential principles of the invention heretofore explained may be embodied in forms and modifications differing in many ways in external appearance from the particular construction illustrated and described in this specification. All such modifications are within the scope of my invention provided they contain the elements, or their equivalents, of the appended claims.

So far as I am aware the mechanism according to which the variable movement of the sighting vanes or driven member is derived from uniform rotation of the driver, is a new idea of means for transmitting motion, and as such is capable of a wide variety of uses in driving mechanical parts which are designed to have variable speeds. I declare, therefore, that I do not limit my invention, in respect to the driving mechanism, to the combination with the sighting or indicating means of an azimuth instrument, but that I include within the scope of my invention and of certain of the following claims, mechanism designed for any purpose whatever in which the axes of the driver and the driven member are adjustable at various angles, and in which the transmitting connection between these members includes a guide occupying a spherical relation to a common point in said axes.

Having thus described the principles of my invention but without attempting to describe all the forms in which the invention may be embodied, or all the modes of its use, I declare that what I claim is:

1. An apparatus comprising in combination a driven member arranged to revolve about an axis, a driver arranged to revolve about an axis which passes through a point in the axis of the driven member, a support curved concentrically about the common point of the said axes on which said driver is adjustably mounted, and transmission means between said driver and driven member including a guide curved about said common point and a sliding element occupying said guide, said support being extended through an arc of at least ninety degrees and positioned to permit the driver to be adjusted with its axis perpendicular to the axis of the driven member or in coincidence therewith, or at any intermediate angle with respect thereto.

2. The combination of a driver and a driven member arranged to rotate respectively about axes which pass through a common point, a support curved about said common point in a plane other than perpendicular to the axis of the driven member, the driver being mounted on said support with provision for adjustment thereon about said common point, and the support extending through an arc of at least ninety degrees whereby said driver may be placed with its axis perpendicular to or in coincidence with or at any intermediate angle to the axis of the driving member, and transmission means for imparting movement from the driver to the driven member.

3. An apparatus comprising a driver and a driven member rotatable respectively about axes which pass through a common point, motion transmitting means between said members comprising a guide connected with the driven member and a slide connected with the driver and engageable with said guide, said guide being continuous on an arc of uniform radius of which the center is said common point and which passes through the axis of the driven member and extends approximately ninety degrees on each side of such axis, and means for supporting the driver with provision for adjustment angularly about said common point in a plane other than perpendicular to the axis of the driven member, between positions of which it is respectively perpendicular to and in coincidence with the axis of the driven member.

4. In an apparatus of the character described, a driven member rotatable about an axis, a yoke secured to said driven member and curved about a point in such axis in a plane including the axis, said yoke having a guide portion crossing such axis and extending on an arc of uniform radius about such point approximately ninety degrees on each side of the said axis, a driver having a slide occupying said guide, and a support adjustably holding said driver, the support being curved about the axis of said yoke at a plane including the axis of the driven member, and the driver being supported with its axis in the same plane and passing through the same central point.

5. An apparatus of the character described comprising driving and driven members adapted to rotate about axes which pass through a common point, a transmission member connected to the driven member and having a continuous guideway of uniform radius curved about said common point in a plane passing through the axis of the driven member and extending approximately ninety degrees on each side of said axis, said driving member having an element occupying said guideway, and a support curved on an arc about the same common point in a plane passing through said axis and having a radius greater than that of said transmission member, and extending through an arc of at least ninety degrees, and means connecting said driver to said support arranged to hold the driver with its axis radial to such common point and in a manner permitting such axis to be brought perpendicular to the axis of the driven member without interference therewith.

6. An apparatus comprising a driver and a driven member adapted to rotate about axes passing through a common point, a transmission member connected with said driven member and having a guide portion curved about said common point on an arc of uniform radius in a plane containing the axis of the driven member and crossing said axis without interruption, the driving member having an element engaging said guide member, a self-contained motor connected with said driver for operating the same and contained wholly within the space embraced by said transmission member, and a support lying wholly outside of the path of said transmission member on which said driver is adjustably mounted.

7. An apparatus comprising a driver and a driven member adapted to rotate about axes passing through a common point, a transmission member connected with said driven member and having a guide portion curved about said common point on an arc of uniform radius in a plane containing the axis of the driven member and crossing said axis without interruption, the driving member having an element engaging said guide member, a self-contained motor connected with said driver for operating the same and contained wholly within the space embraced by said transmission member, and a support lying wholly outside of the path of said transmission member on which said driver is adjustably mounted, said support being curved about said common point in a plane containing the axis of the driven member, and the mounting for said driver being a slide arranged to travel longitudinally on said support and including a connecting arm leading from said support and making an angle of more than ninety degrees with the axis of the driver.

8. An azimuth instrument comprising a supporting means or standard, a dial, a gimbal joint hung upon said standard and upon which said dial is mounted with provision for rotation in its own plane, a curved bar or bow connected with said dial and depending from the under side thereof, a sighting means rotatably mounted on said dial to turn about a vertical axis, said bow having a guiding portion curved about a point in such axis and occupying a plane which passes through the axis, a slide mounted upon said guide portion with provision for adjustment longitudinally thereon, a driving member rotatably supported on said slide with its axis of rotation passing through the center of said guide portion, means for rotating said driver and motion transmission connections between said driver and said sighting means.

9. An azimuth chronometer comprising a supporting means having a bearing, a sighting member rotatably mounted in said bearing, a curved bar depending from the under side of said bearing and curved about a point in the axis of the sighting means and occupying a plane which passes through said axis, a slide mounted on said curved bar with provision for adjustment longitudinally thereon, a timepiece mounted upon said slide in a central position with respect to the curved bar, a driver rotatably mounted on the timepiece mounting with its axis passing through the center of curvature of the bar, gearing through which said timepiece rotates said driver, a driving element carried by said driver, a transmission member connected to the sighting means and having a guide portion engaged with said driving element, said guide portion being curved about the center of the curved bar on a radius less than the radius of the bar and greater than the distance of any point of the timepiece or driver from said center, said transmission member having a guide portion engaged with said driving element.

10. An azimuth chronometer comprising a driver rotating at a uniform rate, a driven member mounted and arranged to rotate in a horizontal plane, a curved guide element connected with said driven member lying in a plane which includes the axis of rotation of the driven member, and a traveler carried by said driver constructed to engage said guide element and travel in contact therewith, the axis of rotation of said traveler passing through the center of curvature of said guide element, and means for supporting said traveler located clear of the orbits of all points in said guide element.

11. An azimuth chronometer comprising a horizontally rotatable member and means for driving said member continuously throughout more than a complete rotation at a rate corresponding to the rate of change in bearing of the sun or other heavenly body, comprising a rotatable driving shaft, means for rotating said shaft at a uniform rate of speed, said shaft being adjustable at an inclination corresponding to the latitude of the place of use, and means for continuously transmitting motion from said driving shaft to said driven member arranged to permit complete rotation without interference.

12. An azimuth chronometer comprising rotatable driving and driven elements so adjustable that their axes may be relatively changed to any desired angle about their point of intersection, a prime mover located near the point of intersection of such axes, and transmission means at a greater distance than the prime mover from said point rotatable about such prime mover and driven by the latter.

13. In an instrument of the character described, a rotating driven member having guide members extending equal distances to opposite sides of the axis of rotation thereof and curved concentrically about a point in such axis, a driver comprising one or more elements adapted to travel in said guide members and supported to rotate about the same point with which said guide members are concentric, said driver being also adjustable about the same point to various angles with respect to the axis of the driven member, and a prime mover located within the space circumscribed by the travel of said guide members and driver.

14. An apparatus of the character indicated comprising a pivotally hung and pendulum-weighted support, a meridian index mounted horizontally upon said support and adjustable about a vertical axis, a sighting means rotatable horizontally about the same axis, a curved bar or bow hung from said support and occupying a plane which passes through said axis, a holder mounted upon said bow and adjustable along the same, a clock supported by said holder within the space inclosed by the bow, an annular wheel surrounding the clock and journaled thereon upon an axis perpendicular to the plane of the wheel, gearing driven by the clock for driving said wheel at the angular rate of rotation of the earth, studs secured upon said wheel at diametrically opposite points thereof and arranged to travel in a plane of which the center coincides with the axis of curvature of said wheel and with the axis of rotation of said sighting means, and a yoke curved concentrically with the same axis, carried by the sighting means, and having a guiding element in engagement with one or both of said studs.

15. An azimuth instrument comprising a graduated dial adapted to be rotated in a horizontal plane, a support connected to said dial and curved about a point in the axis of the dial, a driven member rotatable about the axis of the dial, a driver mounted upon said support within the space embraced by the support and mounted to rotate about an axis crossing the center of curvature thereof, and transmission mechanism comprising a guide connected with the driven member and curved concentrically about said center, and a traveler carried by the driver and engaging said guide, the guide being located within the space subtended by the support, whereby it is enabled to rotate completely without interference with the support.

16. An azimuth instrument comprising a curved support, a holder mounted upon said support with provision for adjustment longitudinally thereof and extending toward the center of curvature thereof, a driver mounted upon said holder arranged to turn about an axis passing through the center of curvature of the support and making an angle with the holder, a traveler or slide carried by the driver at a distance from the axis of rotation thereof, and a driven member mounted to rotate about an axis intersecting the axis of the driver in the center of curvature of the support and including a guideway curved about such point of intersection and at a less distance therefrom at all points than the support, said guideway receiving the said traveler.

17. An azimuth instrument comprising a relatively fixed support curved about an interior point and constructed to leave an open space on its concave side, a holder mounted upon said support with provision for adjustment along the same, having a portion extending toward the axis of the support, a motor carried by said holder, an annular gear surrounding said motor and mounted thereon to rotate about an axis crossing the center of curvature of the support, a pinion driven by the motor meshing with said gear for rotating the latter, a traveler or driver carried by the annular gear externally thereof, a driven member mounted to rotate about an axis intersecting the axis of the support, and a guide element connected to the driven member curved concentrically about the point of intersection of such axes and engaged with said driver, said guide element being situated intermediate the annular gear and the imaginary spherical surface of which the support is a meridian.

18. An azimuth instrument comprising a dial, sighting means mounted to rotate about the axis of said dial, a yoke connected to said sighting means having a guide portion extending on opposite sides of said axis and equally distant at all points from a point in such axis, a support secured to said dial extending on a curve of uniform radius about the said point as a center and being at a greater distance than the guide portion from said point, and a driver adjustably mounted upon said support and arranged to rotate about an axis passing through said point, and engaging said guide portion.

19. An azimuth chronometer comprising a timepiece, a holder for said timepiece, a support for said holder, an annular gear mounted upon the timepiece and surrounding the same, a pinion driven by the timepiece for rotating said annular gear, a sighting means rotatable about a vertical axis and transmission mechanism for rotating the sighting means comprising a stud carried by the said annular gear and a guide member connected with the sighting means adapted to receive said stud, said guide and the support being curved about a common point which lies in the axis of the sighting means, and the axis of rotation of the annular gear passing through such common point, the support being more distant at all points from such common point than any part of said guide member, and the holder for the timepiece being adjustable on the support, whereby the axis of the gear may be placed at a variety of angles with respect to the axis of the sighting means.

20. The combination of a rotary driver, a rotary driven member having a guide portion, a holder for the driver and a support for said holder, the said guide portion and support being curved about the same point in the axis of the driven member and the support being at a greater distance from said point than any part of the guide portion, whereby a complete rotation of the latter is permitted, and the driver being mounted to rotate about an axis passing through the same point and having a traveler arranged and constructed to engage said guide portion and apply force thereto.

21. The combination of a rotary driver, a rotary driven member having a guide portion, a holder for the driver and a support for said holder, the said guide portion and support being curved about the same point in the axis of the driven member and the support being at a greater distance from said point than any part of the guide portion, whereby a complete rotation of the latter is permitted, and the driver being mounted to rotate about an axis passing through the same point and having a traveler arranged and constructed to engage said guide portion and apply force thereto, the holder being adjustable upon said support and having its portion which holds the driver extending from the support toward the axis of curvature of the latter at an oblique angle to the axis of the driver.

In testimony whereof I have affixed my signature, in presence of two witnesses.

HORACE S. BUTTERFIELD.

Witnesses:
  OLOF OTIKON,
  ARTHUR H. BROWN.

Copies of this patent may be obtained for five cents each, by addressing the "Commissioner of Patents, Washington, D. C."